Nov. 29, 1966 E. F. DE HAAN ETAL 3,289,024

PHOTO-SENSITIVE DEVICE INCLUDING LAYERS
OF DIFFERENT CONDUCTIVITY TYPES
Filed March 10, 1964

INVENTORS
EDWARD F. DE HAAN
PAULUS PH.M. SCHAMPERS
ABRAHAM VAN DER DRIFT
BY
Frank R. Trifari
AGENT United States Patent Office 3,289,024

Patented Nov. 29, 1966

3,289,024

PHOTO-SENSITIVE DEVICE INCLUDING LAYERS OF DIFFERENT CONDUCTIVITY TYPES

Edward Fokko de Haan, Paulus Philippus Maria Schampers, and Abraham van der Drift, all of Emmasingel, Eindhoven, Netherlands, assignors to North American Philips Company, Inc., New York, N.Y., a corporation of Delaware Filed Mar. 10, 1964, Ser. No. 350,870
Claims priority, application Netherlands, Mar. 12, 1963, 290,121
9 Claims. (Cl. 313—65)

The invention relates to a photo-sensitive device comprising a layer of photo-sensitive material applied to a support. More particularly, the invention relates to such a device in which the material can be rendered, at will, more or less good conducting or intrinsic conducting, the photo-sensitive layer comprising, in its direction of thickness, zones lying one behind the other having different conductivities. Means for supplying electric current to both sides of the layer also are provided.

In a known device of the kind set forth, forming a Vidicon type camera tube, comprising a photo-sensitive target plate of lead monoxide (PbO), the target plate of about 5$\mu$ in thickness comprises zones of opposite conductivity types lying one behind the other, in order to form at least one planar p-n-junction for obtaining a low dark current.

An object of the invention is to provide a device of the kind described above, in which the sensitivity to radiation of shorter wavelength, as compared with the sensitivity to radiation of longer wavelength is suppressed to a greater or lesser extent.

A further object of the invention is to provide a photo-sensitive device which is particularly sensitive to radiation in the red or infrared part of the spectrum.

These and further objects of the invention will appear as the specification progresses.

It has been found that a portion of the photo-sensitive layer which remains substantially free of an electric field with the application of an electric voltage across the layer, can serve as an optical filter for a portion of the layer which is located behind that part and which is not free of an electric field, since it is mainly the charge carriers released in the last-mentioned part which furnish the current that can be measured externally.

Thus, in accordance with the invention in a device of the aforesaid kind, the photo-sensitive layer comprises, besides a zone having a thickness of at least a few microns of material exhibiting intrinsic or substantially intrinsic conductivity, at least one zone adjacent the former and limiting the layer on one side. This zone consists of the same photo-sensitive material, which however has such strong p-type or n-type conductivity that this electrode zone can be considered to be relatively good conducting and to be suitable therefore as a supply electrode for the intrinsic zone. This electrode zone operates as an optical filter, when the intrinsic zone is irradiated across the electrode zone. According to a further development of the invention, the conductivity type of an electrode zone (n-type or p-type) is opposite the nature of the current supply (positive or negative respectively) to the surface of the photo-sensitive layer formed by the particular electrode zone in the operation of the device. This means that such an electrode zone, if it is located on that side of the photo-sensitive layer to which electrons are supplied in the operation of the device and/or from which holes are conducted away (negative current supply), should be p-type conducting, whereas such a zone on that side of the photo-sensitive layer which is, in operation, at a positive voltage relative to the other side of the layer (positive current supply, i.e., supply of holes and/or drainage of electrons) should be n-type conducting. By this measure, the dark current across the layer is kept low.

The invention will be described with reference to a drawing in which.

Figure 1:
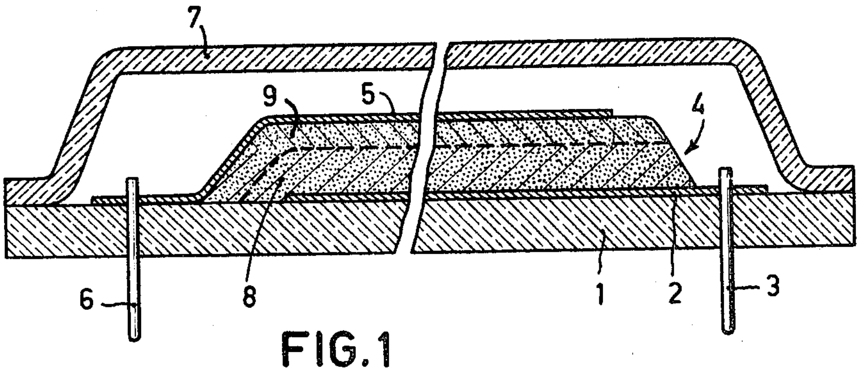
FIG. 1 shows diagrammatically a cross section of a device according to the invention forming a "sandwich" cell.
Figure 3:
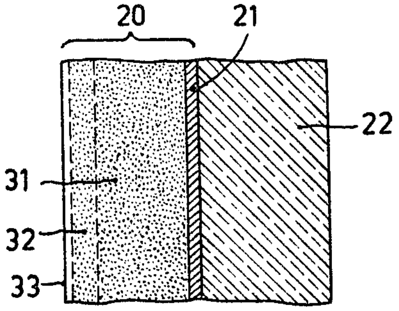
FIG. 3 shows on an enlarged scale part of the cross section of the target plate of the tube shown in FIG. 2.

In all figures and particularly in FIGS. 1 and 3, various dimensions, particularly those of thickness, are shown with great deviation from their correct ratios. To the extent considered necessary, practical values are indicated hereinafter.

In the photo-resistor cell shown in a cross section in FIG. 1, an insulating, transparent support 1 is provided with a planar, transparent electrode 2, to which a contact pin 3 is electrically connected and fastened in the support 1 for the supply of current thereto, and shown in FIG. 1 on the right-hand side. The support is preferably made of glass, in which case the electrode 2 may consist of a conducting layer of tin oxide. In other cases or instead thereof, the electrode 2 may consist of a very thin layer of vapour-deposited metal, for example, gold.

Over the electrode 2 and partly beside the same on the left-hand side there extends a layer 4, which consists principally of a photo-sensitive material which can be rendered, at will, more or less good conducting, or intrinsic conducting, or substantially intrinsic conducting. In the present case, the layer 4 consists principally of lead monoxide (PbO) and has a thickness of about 230$\mu$. Over the layer 4 there extends a second transparent electrode 5, which extends on the left-hand side on the support 1, where it is electrically connected to a second contact pin 6, which is also fastened in the support 1. The electrode 5 may consist of a thin layer of vapor-deposited metal, for example gold or silver. The assembly of the electrodes 2 and 5 and the intermediate photo-sensitive layer 4 sealed from the open air by means of a hood 7 of transparent material, the edge of which is fastened to support 1. The hood may be of the same material as the support 1.

The photo-sensitive layer 4 consists of two joined partial layers 8 and 9, the partial layer 8 being located on the side of the support 1 and the partial layer 9 being located on the side of the electrode 5. The partial layer 8 consists of photosensitive material which is virtually n-type or p-type conducting by a strong deviation from the stoichiometric composition or by the incorporation of suitable impurities to an extent such that, in fact, the partial layer 8 can be considered to be a comparatively good conducting layer. The thickness of the partial layer 8 is about 130$\mu$ and that of the partial layer 9 about 100$\mu$.

When lead monoxide is used for the layer 4, strong p-type conductivity of the partial layer 8 may have been obtained by the incorporation of a comparatively large quantity of additional oxygen in this part of the layer, or of a p-forming element, for example thallium. Instead of being strongly p-type conducting, the partial layer 8 may be strongly n-type conducting, for example, by the incorporation of a comparatively large quantity of an n-forming element, for example bismuth, or antimony, or lead itself in this partial layer.

The partial layer 9 consists of material which, in contrast to the material of the partial layer 8, does not exhibit distinct p-type or n-type conductivity but behaves essentially as intrinsic, or substantially intrinsic conductive. This partial layer 9, which will be briefly termed "intrinsic layer," may be obtained by vapor-deposition of lead monoxide on the previously deposited partial layer 8, in an atmosphere containing besides oxygen an n-forming gas, for example water vapor. The pressure of the oxygen and of the n-forming gas in this atmosphere are adjusted relative to one another so that the quantities of additional oxygen and of the n-forming gas absorbed in the formed layer deposited in the presence of this atmosphere substantially compensate each other. Such a method of obtaining a layer of intrinsic conductivity consisting principally of a metal-oxygen compound is subject-matter of the copending patent application Serial No. 350,713 of the applicant. In order to obtain an increased sensitivity to red sulphur, selenium or tellurium may be incorporated in the partial layer 9.

In the operation of the photo-resistor cell described above, the contact pins 3 and 6 are connected in an electrical circuit comprising a direct-current source. This circuit also includes means for measuring the current passing through the cell, if necessary subsequent to ampilfication. If the partial layer 8 is strongly n-type conducting, the cell is connected in this circuit in such manner that the contact pin 3 is at a positive voltage relative to the contact pin 6, so that the electrode 2 provides the positive current supply to the photo-sensitive layer layer 4. If, on the contrary, the partial layer 8 is strongly p-type conducting, the cell is connected so that it is biased in the reverse order, so that the electrode 2 constitutes the negative current supply to the layer.

When the photo-sensitive layer 4 is irradiated through the support 1, the partial layer 8 absorbs substantially all ultra-violet, and also all visible radiation of a wavelength shorter than that of red, so that the partial layer 9 can be reached only by red and by a radiation having a longer wavelength. The incident radiation releases charge carriers not only in the partial layer 8 but also in the partial layer 9. Since the partial layer 8, as stated above, is more or less conducting, and since consequently there is no electric field in this layer, the charge carrier released in this partial layer do not contribute to the externally measurable current, which therefore results mainly from the charge carriers released substantially only in the partial layer 9. Therefore, when the radiation to which the cell is exposed is incident across the support 1, the photo-resistor cell is mainly sensitive to radiation absorbed only to a reduced extent in the partial layer 8, consequently in the above case to red and infrared radiation. However, X-rays or other similar penetrating radiation can also reach the partial layer 9, through the partial layer 8 so that with this direction of incidence, the cell is also sensitive to this radiation.

If, however, the radiation is incident on the photo-sensitive layer 4 from the other side, that is across the hood 7, the partial layer 9 is no longer screened optically by the partial layer 8, so that in that case the photo-resistor cell is also sensitive to radiation to which the photo-sensitive material is, generally, sensitive, but which would be absorbed substantially completely in the partial layer 8 with a direction of incidence across the support 1. Thus, photo-sensitive layer 4 will be irradiated either through the support 1 or through the hood 7.

Figure 2:
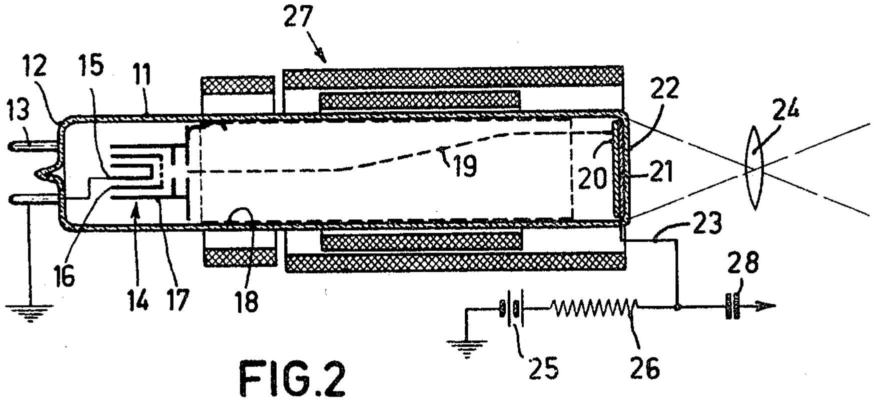
FIG. 2 shows diagrammatically a longitudinal section of a device according to the invention forming a vidicon-type camera tube.

FIGS. 2 and 3 illustrate a vidicon-type camera tube comprising an exhausted, elongated, cylindrical envelope 11 of glass. The left-hand end of the envelope 11 is closed by a glass base 12, accommodating connecting pins 13. These connecting pins are connected to various parts of an electrode system 14, mounted at this end of the envelope 11. This electrode system, shown diagrammatically, and comprising inter alia a cathode 15, a control-grid 16 and a perforated anode 17, which is electrically connected to a wall electrode 18, is capable of producing an electron beam 19 by which a target plate 20 on the other end of the envelope 11 can be scanned.

The target plate 20 consists principally of lead monoxide (PbO), which has been vapor-deposited on a transparent, electrically good conducting signal electrode 21, which extend over the inner side of the window 22 formed by the right-hand end of the envelope 11. The signal electrode 21 may consist of a very thin layer of vapor-deposited metal, for example gold, but as is common practice with tubes of the vidicon type, it may be formed by a layer of tin oxide applied to the window. A current-supply conductor 23, extending through the wall of the envelope 11, is connected to electrode 21. In order to obtain electrical signals corresponding to a picture projected for example by means of an optical system represented diagrammatically in FIG. 2 by a lens 24 across the window 22 and the signal electrode 21 onto the target plate 20 suitable voltages are applied to the electrodes of the system 14, while by means of a voltage source 25, via a signal resistor 26, the signal electrode 21 receives a voltage of 10 to 100 v., for example 40 v., which is positive relative to the cathode 15 of the tube. By means of the conventional deflection and focusing coils surrounding the tube and designated in FIG. 2 in common by 27, the electron beam 19 may perform a movement for scanning the free surface of the target plate 20. With this scanning, the surface is stabilized each time at the potential of the cathode 15, an electrical signal being then produced, which can be derived via a capacitor 28 from the signal resistor 26.

FIG. 3 shows on an enlarged scale part of the cross section of the target plate 20, the signal electrode 21 and the window 22 of the tube shown in FIG. 2. The target plate 20, consisting mainly of vapor-deposited lead monoxide, comprises in fact two partial layers 31 and 32, extending parallel to the signal electrode 21 and being different in electrical respects. The partial layer 31 consists of lead monoxide which is rendered strongly n-type conducting, for example by the incorporation of bismuth or antimony or of water vapor or a combination of these n-forming materials. The partial layer 32 on the contrary consists mainly of lead monoxide behaving electrically as an intrinsic or substantially intrinsic conducting material. This partial layer 32 may contain furthermore a small quantity of sulphur, selenium and/or tellurium in order to raise the sensitivity of this partial layer to radiation of comparatively long wavelength. Only at the free surface of the partial layer 32 to be scanned by the electron beam 19 is the material, designated in FIG. 3 by 33, more or less virtually p-type conducting, the surface material being, however, not conducting to an extent that troublesome transverse conduction occurs.

In the operation of the camera tube described above with reference to FIGS. 2 and 3, the partial layer 31 operates as a positive current supply electrode to the intrinsically conducting partial layer 32 and at the same time as an optical filter. Because radiation of shorter wavelengths is absorbed in the partial layer 31, the maximum of the relative spectral sensitivity of the camera tube is shifted towards longer wavelengths with an increase in thickness of the partial layer 31. With a thickness of the partial layer 32 of 1 to 2$\mu$, there is substantially no sensitivity to ultraviolet and blue left and the sensitivity to green is no longer significant. With a thickness of the partial layer 32 of about 5$\mu$ and with a thickness of partial layer 31 of about 80$\mu$ or more, for example 150$\mu$ only a sensitivity to radiation in the red and infrared spectral region remains.

The partial layer 32, that is the effectively operative part of the target plate 20 has preferably a thickness of 10 to 30$\mu$; if circumstances permit (for example when the capacity of the target plate would not become too low), it is advantageous to choose a larger thickness.

The thickness and the composition of the n-type conductive partial layer 31 may be chosen so that the tube is substantially only sensitive to X-rays, so that when proceeding with such rays, no measures are required for screening daylight from the window 22 of the tube. This may be achieved, for example, with a partial layer 32 of a thickness of about 30μ or more, which layer has a strong absorbability for light of great wavelength by the incorporation of sulphur, selenium or tellurium. The partial layer 32 preferably has a thickness of 60μ or more.

The invention has been explained in the foregoing with reference to examples in which lead monoxide was used as a photo-sensitive material. It will be obvious that the invention is not restricted to the use of this material and that, in principle, any photo-sensitive material which can be rendered at will good conducting, or intrinsically, or substantially intrinsically conducting may be employed.

Therefore, while we have described the invention with reference to specific examples and applications thereof, other modifications will be readily apparent to those skilled in this art without departing from the spirit and scope of the invention which is defined in the appended claims.

What is claimed is:

1. A photo-sensitive device selectively responsive to radiation having a wave-length longer than at least part of the visible range comprising a support, a photo-sensitive layer on said support, said layer having in the direction of thickness zones having different electrical conductivities superposed over one another, and means to supply an electrical current to one side of said layer, said layer having a first zone of a thickness of the order of microns and of an intrinsic conductivity type, and a second adjacent zone of the same material as that of said first zone but of p-type conductivity type and having a conductivity substantially greater than that of said first zone whereby said second zone serves as an electrode for said first zone, said second zone having a thickness at which wave-lengths shorter than at least part of the visible range are absorbed whereby said latter zone serves as an optical filter when said first zone is irradiated through said second zone.

2. A photo-sensitive device as claimed in claim 1 in which the layer is constituted of lead monoxide having zones of different conductivity type.

3. A photo-sensitive device as claimed in claim 2 in which the thickness of the second zone is about 80 to 150μ.

4. A photo-sensitive device selectively responsive to radiation having a wavelength longer than at least part of the visible range comprising a support, a photo-sensitive layer on said support, said layer having in the direction of thickness zones having different electrical conductivities superposed over one another, and means to supply an electrical current to one side of said layer, said layer having a first zone of a thickness of the order of microns and of an intrinsic conductivity type, and a second adjacent zone of the same material as that of said first zone but of n-conductivity type and having a conductivity substantially greater than that of said first zone whereby said second zone serves as an electrode for said first zone, said second zone having a thickness at which wave-lengths shorter than at least part of the visible range are absorbed whereby said latter zone serves as an optical filter when said first zone is irradiated through said second zone.

5. A photo-sensitive device as claimed in claim 4 in which the layer is constituted of lead monoxide having zones of different conductivity type.

6. A photo-sensitive device as claimed in claim 5 in which the thickness of the second zone is about 80 to 150μ.

7. A photo-sensitive device selectively responsive to radiation having a wave-length longer than at least part of the visible range comprising a support, a photo-sensitive layer on said support, said layer having in the direction of thickness zones having different electrical conductivities superposed over one another, and means to supply an electrical current to one side of said layer, said layer having a first zone of a thickness of the order of microns and of an intrinsic conductivity type, and a second adjacent zone of the same material as that of said first zone but of p-conductivity type connected to a negative terminal of said current supply means and having a conductivity substantially greater than that of said first zone whereby said second zone serves as an electrode for said first zone, said second zone having a thickness at which wave-lengths shorter than at least part of the visible range are absorbed whereby said latter zone serves as an optical filter when said first zone is irradiated through said second zone.

8. A photo-sensitive device selectively responsive to radiation having a wave-length longer than at least part of the visible range comprising a support, a photo-sensitive layer on said support, said layer having in the direction of thickness zones having different electrical conductivities superposed over one another, and means to supply an electrical current to one side of said layer, said layer having a first zone of a thickness of the order of microns and of an intrinsic conductivity type, and a second adjacent zone of the same material as that of said first zone but of n-conductivity type connected to a positive terminal of said current supply means and having a conductivity substantially greater than that of said first zone whereby said second zone serves as an electrode for said first zone, said second zone having a thickness at which wave-lengths shorter than at least part of the visible range are absorbed whereby said latter zone serves as an optical filter when said first zone is irradiated through said second zone.

9. A vidicon-type camera tube comprising an envelope having a window therein, a transparent signal electrode supported by said window, a photosensitive layer of lead monoxide supported on said signal electrode, said layer having in the direction of thickness zones having different electrical conductivities superposed over one another, said layer having a first zone adjacent said signal electrode consisting of a material of n-conductivity type having a thickness at which wave-lengths of radiation incident thereon are selectively transmitted to the underlying zones whereby said photosensitive layer has a given spectral sensitivity, a second zone adjacent said first zone consisting of a material which is intrinsically conductive, and a third zone adjacent said second zone and remote from said signal electrode consisting of a material of p-conductivity type without appreciable transverse conductivity, and means to scan the surface of said latter zone with an electron beam to thereby obtain an electrical signal proportional to light intensities at discrete areas on the surface of the photosensitive lead monoxide layer.

References Cited by the Applicant

UNITED STATES PATENTS

| | | |
|---|---|---|
| 2,886,726 | 5/1959 | Berger et al. |
| 2,890,359 | 6/1959 | Heijne et al. |
| 2,910,602 | 10/1959 | Lubszynski et al. |
| 3,003,075 | 10/1961 | Krieger et al. |
| 3,136,909 | 6/1964 | Cope. |
| 3,225,198 | 12/1965 | Mayer. |
| 3,229,104 | 1/1966 | Rutz. |

JAMES W. LAWRENCE, *Primary Examiner.*

R. SEGAL, *Assistant Examiner.*